(12) United States Patent
Kito

(10) Patent No.: US 8,169,451 B2
(45) Date of Patent: May 1, 2012

(54) CONTENT TRANSMISSION APPARATUS AND CONTENT DISPLAY SYSTEM

(75) Inventor: Toshiyuki Kito, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 12/468,731

(22) Filed: May 19, 2009

(65) Prior Publication Data

US 2010/0033512 A1  Feb. 11, 2010

(30) Foreign Application Priority Data

Aug. 11, 2008  (JP) ................... 2008-207035

(51) Int. Cl.
*G09G 5/10* (2006.01)
(52) U.S. Cl. .......................... 345/690; 725/81
(58) Field of Classification Search .......... 345/2.3, 345/690; 715/634–740, 748; 455/566, 67.11, 455/66.1; 725/81; 348/725
See application file for complete search history.

(56) References Cited

U.S. PATENT DOCUMENTS

| | | | | |
|---|---|---|---|---|
| 6,148,100 | A * | 11/2000 | Anderson et al. | 382/153 |
| 6,157,935 | A * | 12/2000 | Tran et al. | 715/202 |
| 6,462,676 | B1 * | 10/2002 | Koizumi | 340/995.1 |
| 2005/0117070 | A1 * | 6/2005 | Wu et al. | 348/725 |
| 2007/0044025 | A1 * | 2/2007 | Sakamoto | 715/734 |
| 2007/0173291 | A1 | 7/2007 | Morotomi | |
| 2007/0240190 | A1 * | 10/2007 | Arseneau et al. | 725/81 |

FOREIGN PATENT DOCUMENTS

| | | |
|---|---|---|
| JP | 11-340900 | 12/1999 |
| JP | 2003-244289 | 8/2003 |
| JP | 2004-173003 | 6/2004 |
| JP | 2004-320396 | 11/2004 |
| JP | 2005-354343 | 12/2005 |
| JP | 2006-067022 | 3/2006 |
| JP | 2007-336586 | 12/2007 |

* cited by examiner

*Primary Examiner* — Quan-Zhen Wang
*Assistant Examiner* — Yuk Chow
(74) *Attorney, Agent, or Firm* — Patterson & Sheridan, LLP

(57) ABSTRACT

A content transmission apparatus includes a communication module configured to carry out wireless communication with a partner apparatus, a detection module configured to detect a motion of the content transmission apparatus, and a transmission control module configured to control the communication module to transmit content to the partner apparatus and to transmit correction information corresponding to the motion of the content transmission apparatus detected by the detection module during transmission of the content to the partner apparatus.

3 Claims, 5 Drawing Sheets

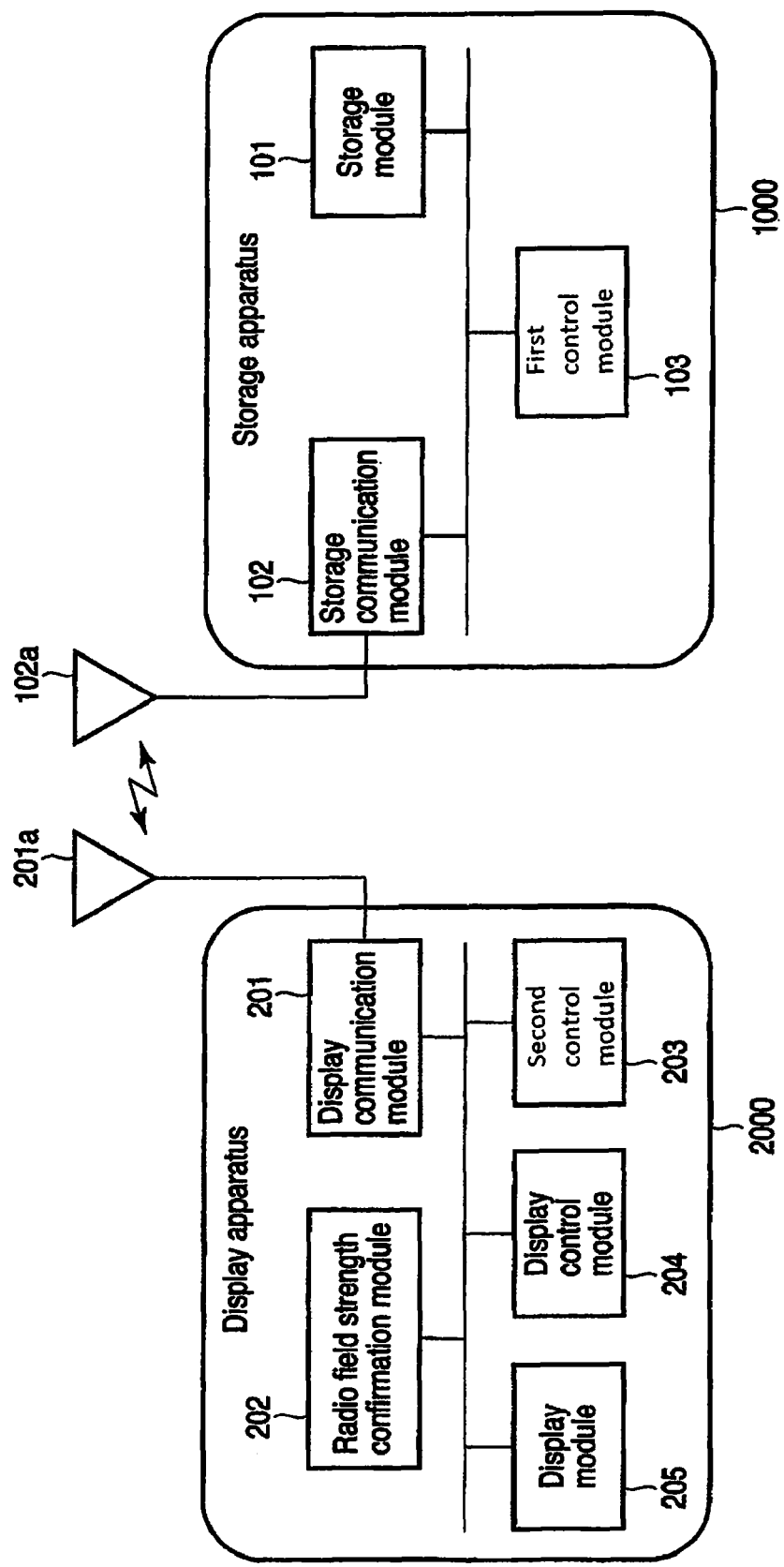
F I G. 1

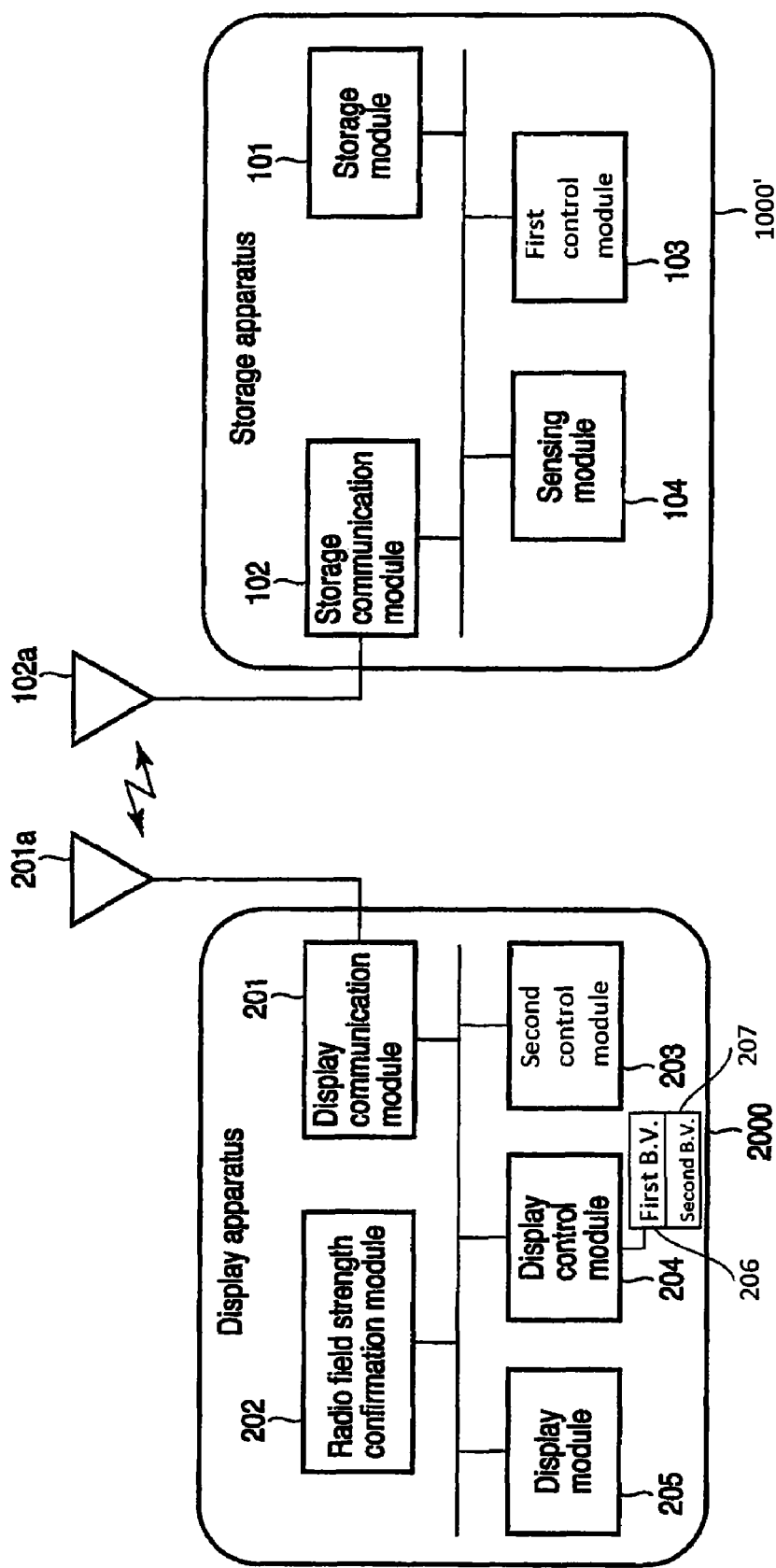
F I G. 3

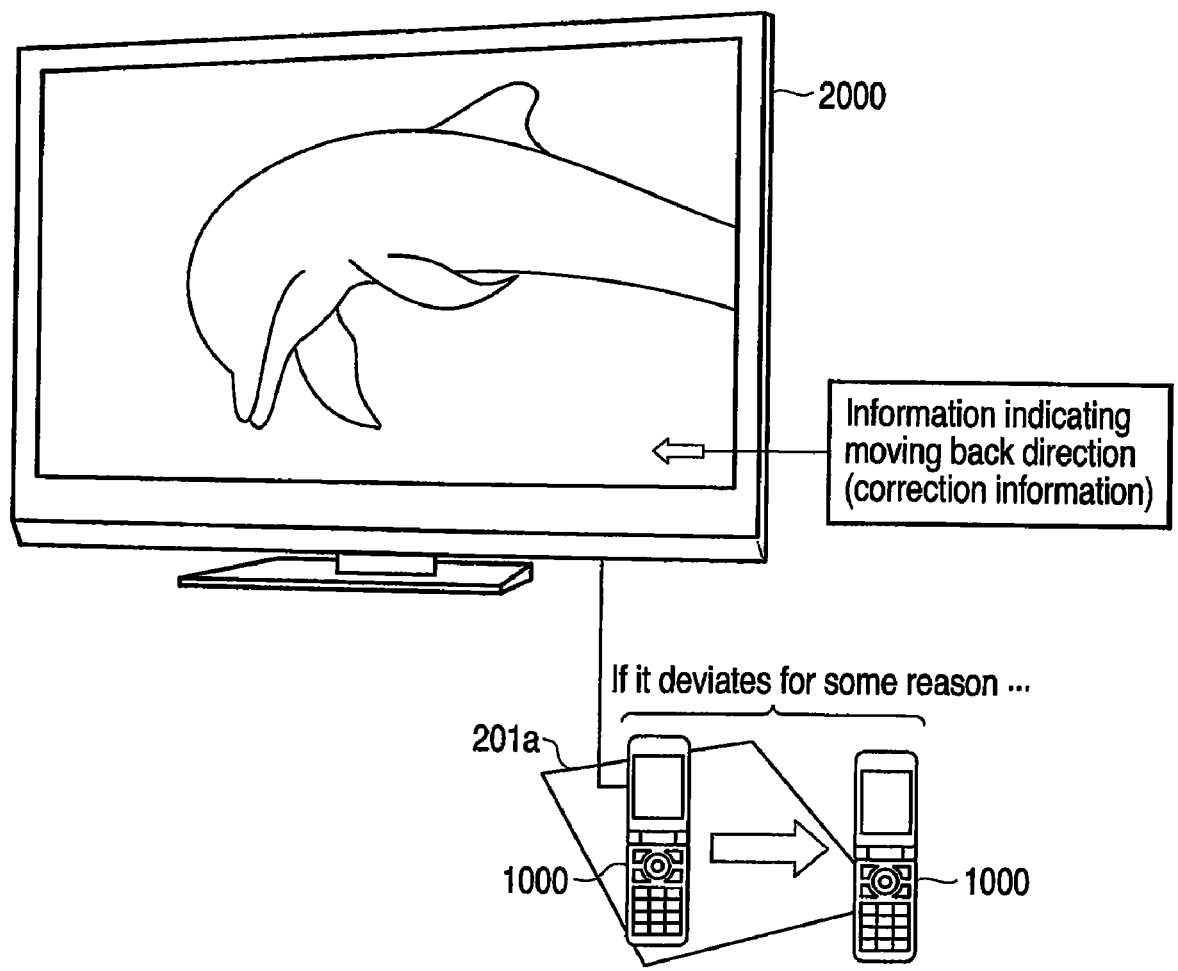
F I G. 6

CONTENT TRANSMISSION APPARATUS AND CONTENT DISPLAY SYSTEM

CROSS-REFERENCE TO RELATED APPLICATIONS

This application is based upon and claims the benefit of priority from Japanese Patent Application No. 2008-207035, filed Aug. 11, 2008, the entire contents of which are incorporated herein by reference.

BACKGROUND

1. Field

One embodiment of the invention relates to a content transmission apparatus which transmits content via wireless communication. Another embodiment of the invention relates to a content display system which receives and displays content transmitted from such a content transmission apparatus.

2. Description of the Related Art

A technique that connects a media player and transmission apparatus via a cable, connects a television and reception apparatus via a cable, and transmits video data, audio data, and the like from the transmission apparatus to the reception apparatus via wireless communication is known. With this technique, the television can be relatively freely laid out.

However, the distance between the transmission apparatus and reception apparatus, shields, or installation direction impose large influences on the wireless transmission. Jpn. Pat. Appln. KOKAI Publication No. 2005-354343 discloses a technique in which a reception apparatus detects the reception strength, and information of the installation position of the reception apparatus is displayed based on the detection result of the reception strength.

In recent years, portable electronic devices such as portable phones have gained advanced performances, and can play back content such as video data stored in storage units. Furthermore, the portable electronic devices can transfer content to large-screen display apparatuses such as TVs via a close proximity wireless transfer. As a result, the user can enjoy content transferred from the portable electronic device on a large-screen display apparatus.

Since the aforementioned close proximity wireless transfer is communication for a communication distance as small as 3 cm, if the portable electronic device deviates from a communication antenna of the large-screen display apparatus even slightly, the screen is often disturbed. It is difficult to compensate for such slight deviation by only the reception strength at the communication antenna of the large-screen display apparatus. That is, it is difficult to detect the deviation direction of the portable electronic device based only on the reception strength at the communication antenna of the large-screen display apparatus.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is a schematic block diagram showing the arrangement of a content display system according to a first embodiment of the invention;

FIG. 3 is a schematic block diagram showing the arrangement of a content display system according to a second embodiment of the invention;

FIG. 6 is a view showing a display example of correction information based on motion detection according to the second embodiment.

DETAILED DESCRIPTION

Figure 2:
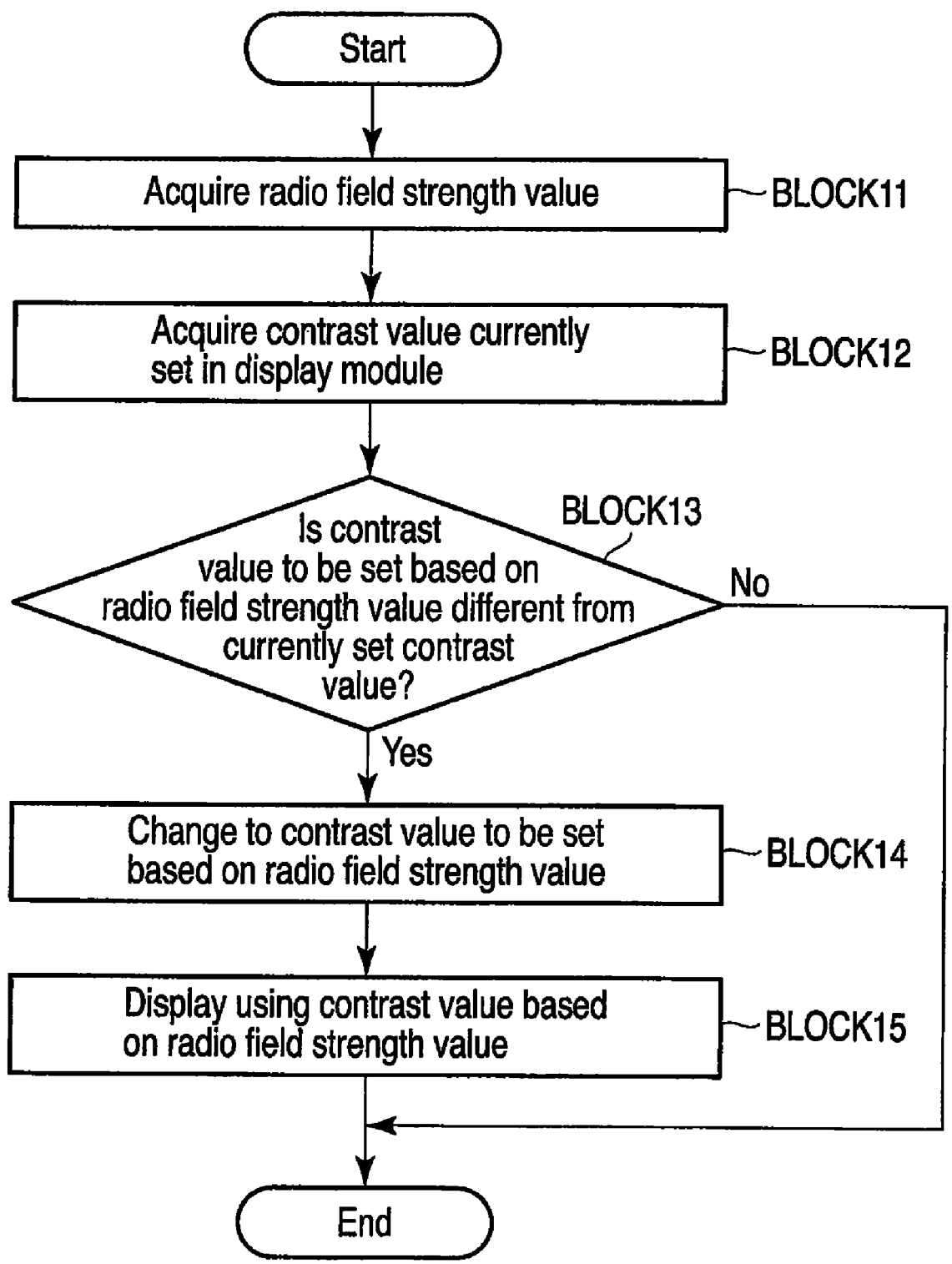
FIG. 2 is a flowchart for explaining contrast control based on a radio field strength value according to the first embodiment.

Various embodiments according to the invention will be described hereinafter with reference to the accompanying drawings. In general, a content transmission apparatus according to one embodiment of the invention comprises a communication module configured to carry out wireless communication with a partner apparatus, a detection module configured to detect a motion of the content transmission apparatus, and a transmission control module configured to control the communication module to transmit content to the partner apparatus and to transmit correction information corresponding to the motion of the content transmission apparatus detected by the detection module during transmission of the content to the partner apparatus.

Embodiments of the invention will be described hereinafter with reference to the accompanying drawings.

FIG. 1 is a schematic block diagram showing the arrangement of a content display system according to a first embodiment of the invention. As shown in FIG. 1, a content display system comprises a storage apparatus 1000 such as a portable phone and a display apparatus 2000 such as a broadcast reception and display apparatus. The storage apparatus 1000 comprises a storage module 101, storage communication module 102, and first control module 103. The display apparatus 2000 comprises a display communication module 201, radio field strength confirmation module 202, control module 203, display control module 204, and display module 205.

The storage apparatus 1000 will be described first. The storage module 101 is a built-in type hard disc drive or SD®, and stores content. This content includes, for example, video content, audio content, and audiovisual content. The storage communication module 102 comprises an antenna 102*a*, and transmits content to a communication partner (display apparatus 2000). The first control module 103 controls transmission of content.

The display apparatus 2000 will be described below.

The display communication module 201 comprises an antenna 201*a*, and receives content transmitted from a communication partner (storage apparatus 1000). The radio field strength confirmation module 202 detects a received radio field strength value of content by the display communication module 201. The second control module 203 instructs the display control module 204 to display content received by the display communication module 201, and to execute contrast control of the display module 205 based on the received radio field strength value detected by the radio field strength confirmation module 202. The display module 204 controls display of content received by the display communication module 201, and the contrast of the display module 205 based on instructions from the second control module 203. The display module 205 displays content under the control of the display control module 204.

The contrast control based on the radio field strength value will be described below with reference to the flowchart shown in FIG. 2.

The storage apparatus 1000' and display apparatus 2000 start communication. The first control module 103 of the storage apparatus 1000' controls transmission of content stored in the storage module 101, and the storage communication module 102 transmits content stored in the storage module 101 based on this control. The display communication module 201 of the display apparatus 2000 receives transmitted content, the second control module 203 instructs the display control module 204 to control display of the received content, the display control module 204 controls display of the received content, and the display module 205 displays the received content based on this control. In this way, content transmitted from the storage apparatus 1000' is displayed on the display apparatus 2000.

The radio field strength confirmation module 202 detects a received radio field strength value in correspondence with the communication between the storage apparatus 1000' and display apparatus 2000 (block 11). The control module 203 instructs the display control module 204 to execute contrast control of the display module 205 based on the received radio field strength value detected by the radio field strength confirmation module 202. The display control module 204 acquires a currently set contrast value of the display module 205 (block 12).

The display control module 204 compares a contrast value to be set based on the detected received radio field strength value, and the currently set contrast value, and checks if the contrast value to be set is different from the currently set contrast value (block 13). If the contrast value to be set is different from the currently set contrast value (YES in block 13), the display control module 204 sets the contrast value based on the detected radio field strength value (block 14). In response to this, the display module 205 displays content and the like to have the contrast value according to the detected received radio field strength value (block 15). If the contrast value to be set is the same as the currently set contrast value (NO in block 13), the display control module 204 does not change the contrast value. By periodically repeating the aforementioned processes in blocks 11 to 15 described above, the user can recognize a real-time radio field strength (change) based on the contrast of content on the display screen.

Furthermore, an example of setting of a contrast value will be described below. For example, the display control module 204 stores contrast values to be set in correspondence with different received radio field strength value ranges. That is, when a detected first received radio field strength value is included in a first received radio field strength value range, the display control module 204 sets a first contrast value associated with the first received radio field strength value range. When a detected second received radio field strength value is also included in the first received radio field strength value range, the display control module 204 also sets the first contrast value. When a detected third received radio field strength value is included in a second received radio field strength value range, the display control module 204 sets a second contrast value associated with the second received radio field strength value range. In this way, the contrast can be prevented from being frequently changed in accordance with slight variations of the received radio field strength value (e.g., a variation from the first received radio field strength value to the second received radio field strength value). That is, only when the received radio field strength value varies to some extent (e.g., a variation from the first received radio field strength value to the third received radio field strength value), the contrast can be changed.

FIG. 3 is a schematic block diagram showing the arrangement of a content display system according to a second embodiment of the invention. As shown in FIG. 3, a content display system comprises a storage apparatus 1000' such as a portable phone and a display apparatus 2000 such as a broadcast reception and display apparatus. The storage apparatus 1000' comprises a storage module 101, storage communication module 102, first control module 103, and sensing module 104. The display apparatus 2000 comprises a display communication module 201, radio field strength confirmation module 202, second control module 203, display control module 204, and display module 205. Note that common modules in the first and second embodiments are denoted by the same reference numbers, and a description of common operations of the common modules will not be repeated. The display control module is configured to control the display module to a first brightness value 206 based a first radio field strength value detected by the radio field strength detection module, and to control the display module to a second brightness value 207 darker than the first brightness value based on a second radio field strength value smaller than the first radio field strength value detected by the radio field strength detection module.

The storage apparatus 1000' will be described first. The storage communication module 102 transmits not only content but also correction information (to be described later) to a communication partner (display apparatus 2000). The first control module 103 controls not only transmission of content but also that of correction information. The sensing module 104 is an acceleration sensing module which detects, e.g., an acceleration and acceleration direction.

The display apparatus 2000 will be described below. The display communication module 201 receives not only content transmitted from a communication partner (storage apparatus 1000') but also correction information transmitted from the communication partner (storage apparatus 1000'). The control module 203 instructs the display control module 204 to display content received by the display communication module 201, to execute contrast control of the display module 205 based on a received radio field strength value detected by the radio field strength confirmation module 202, and to display correction information received by the display communication module 201. The display control module 204 controls display of content received by the display communication module 201, the contrast of the display module 205, and display of the correction information received by the display communication module 201 based on instructions from the second control module 203. The display module 205 displays the content and correction information under the control of the display control module 204. For example, the correction information is superimposed on the displayed content.

Correction information display based on motion detection will be described below with reference to the flowcharts shown in FIGS. 4 and 5.

As described above, the storage apparatus 1000' and display apparatus 2000 start communication, and content transmitted from the storage apparatus 1000' is displayed on the display apparatus 2000. Meanwhile, the sensing module 104 detects a motion (deviation) of the self apparatus (i.e., the storage apparatus 1000'). For example, the sensing module 104 detects a moving direction of the self apparatus (i.e., the storage apparatus 1000'). Note that the sensing module 104 may detect a moving amount in addition to the moving direction of the self apparatus.

Figure 4:
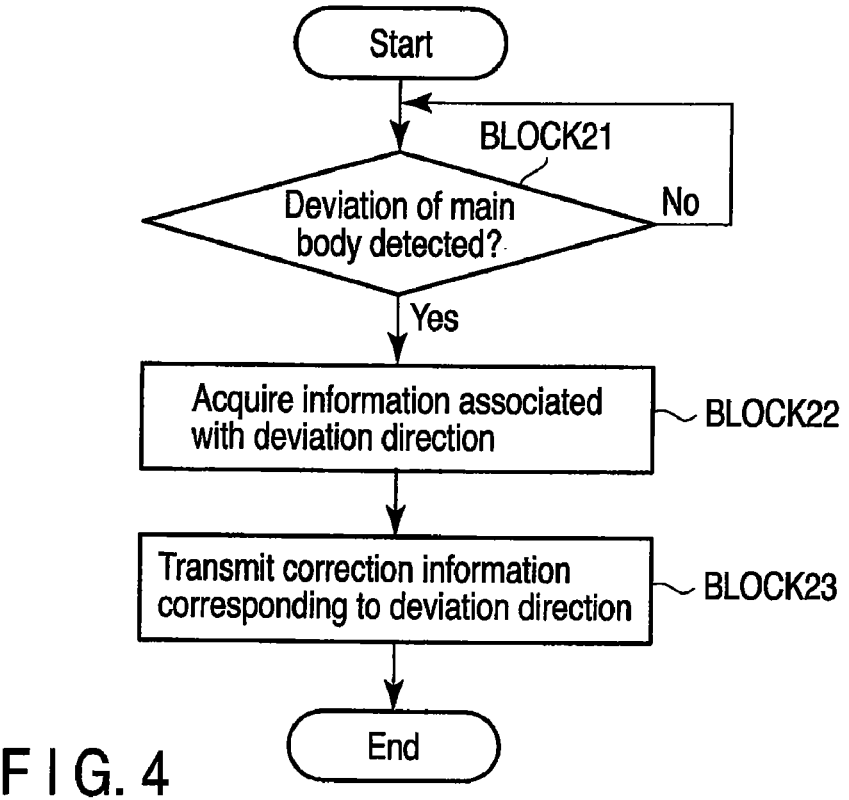
FIG. 4 is a flowchart for explaining an example of transmission of correction information based on motion detection according to the second embodiment.

As shown in FIG. 4, if the sensing module 104 detects a motion (deviation) of the self apparatus (YES in block 21), it notifies the first control module 103 of information associated with the detected motion of the self apparatus. The first control module 103 acquires the information associated with the detected motion of the self apparatus (block 22), generates correction information corresponding to the detected motion of the self apparatus, and controls transmission of this correction information. In response to this, the storage communication module 102 transmits the correction information (block 23). The correction information is information corresponding to the detected moving direction (and moving amount) of the self apparatus, and is, for example, adjustment direction information (e.g., an arrow) which prompts the user to move back the self apparatus in a direction opposite to the moving direction.

Figure 5:
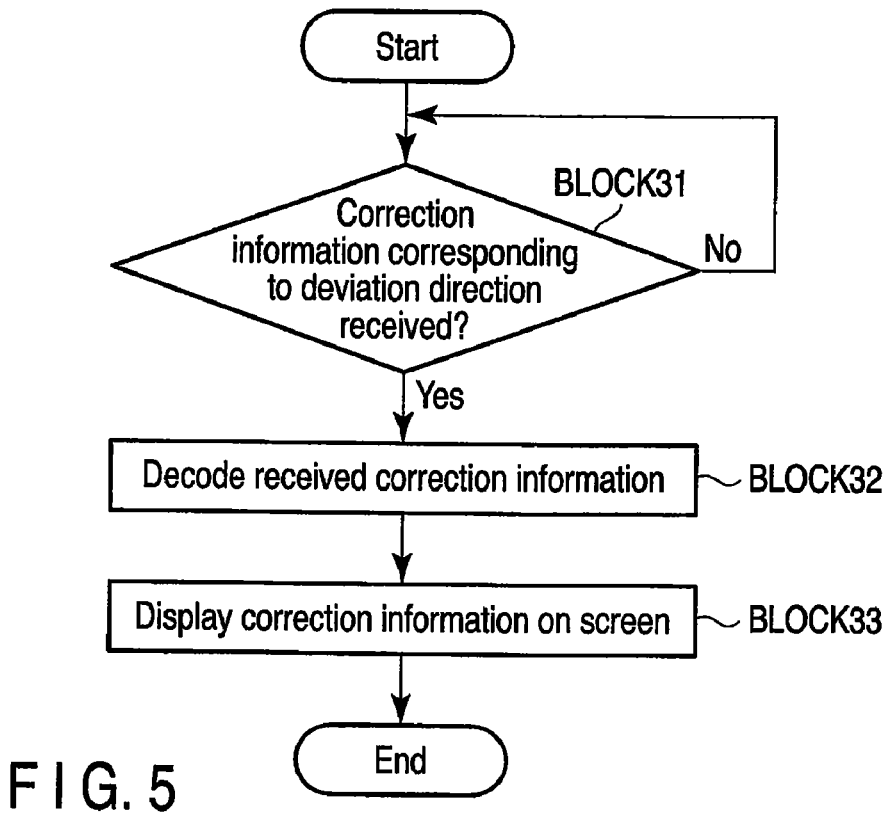
FIG. 5 is a flowchart for explaining an example of display of correction information based on motion detection according to the second embodiment.

As shown in FIG. 5, if the display communication module 201 of the display apparatus 2000 receives the correction information (YES in block 31), the display control module 204 decodes the received correction information (block 32), and the display module 205 displays the decoded correction information (e.g., an arrow) (block 33). At this time, the display control module 204 generates a composite video picture by superimposing a video picture of the correction information on a part of that of the content, and the display module 205 displays this composite video picture (see FIG. 6). The user can recognize by observing the video picture of the correction information displayed on a part of that of the content that the storage apparatus 1000' has deviated, and can appropriately adjust the deviation.

Furthermore, the aforementioned contrast control based on the radio field strength value and the correction information display based on motion detection can be combined. That is, the storage apparatus 1000' transmits correction information based on motion detection to the display apparatus 2000. Upon reception of the correction information, the display apparatus 2000 displays the correction information, and controls the contrast of a content video picture based on the detected radio field strength value. As a result, the user can recognize a change in radio field strength (a deviation of the storage apparatus 1000') based on the contrast of the entire screen of the display apparatus 2000, and can also recognize the adjustment method of the deviation of the storage apparatus 1000' based on the correction information displayed on a part of the screen of the display apparatus 2000.

Note that as the method of detecting the deviation of the storage apparatus 1000', the following methods may be adopted. For example, the display apparatus 2000 comprises two or more antennas, and detects the deviation of the storage apparatus 1000' based on the difference value of the radio field strength values acquired by these antennas. That is, when the difference value is larger than a threshold, it is determined that the storage apparatus 1000' has deviated. Alternatively, the display apparatus 2000 comprises one or more antennas, periodically monitors the radio field strength values acquired by this antenna, and detects the deviation of the storage apparatus 1000' based on the difference value between the current strength value and previous strength value. That is, when the difference value is larger than a threshold, it is determined that the storage apparatus 1000' has deviated.

In the content display systems described in the aforementioned first and second embodiments, when the storage apparatus 1000' has deviated and a radio field strength received by the display apparatus 2000 becomes weak while the display apparatus 2000 plays back content by streaming, the screen display of the display apparatus 2000 darkens. As a result, the user can recognize the deviation of the storage apparatus 1000'. In the content display system described in the aforementioned second embodiment, the display apparatus 2000 displays adjustment direction information (e.g., an arrow). Hence, the user can appropriately adjust the deviation of the storage apparatus 1000'.

When the storage apparatus 1000' (antenna 102a) cannot be appropriately aligned with the antenna (antenna pad) 201a of the display apparatus 2000, the display apparatus 2000 cannot receive a radio signal of sufficient strength. In such a case, the communication efficiency between the storage apparatus 1000' and display apparatus 2000 drops, and the adverse effect may often be imposed on the content playback. According to the content display systems according to the first and second embodiments, the user can recognize the positional deviation of the storage apparatus 1000'. Furthermore, according to the content display system described in the second embodiment, the user can recognize the appropriate adjustment method of the positional deviation of the storage apparatus 1000'. Therefore, the aforementioned communication efficiency drop can be prevented.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus comprising:
   a transmitter and receiver configured to carry out wireless communication with a display device;
   a sensing module configured to detect a moving direction of the apparatus; and
   a control module configured to control the transmitter and receiver to transmit content to the display device and to transmit correction information during transmission of the content to the display device,
   wherein the correction information includes information about a direction along which the apparatus is to be moved, the direction along which the apparatus is to be moved being opposite to the moving direction of the apparatus detected by the sensing module.

2. A content display system including a first apparatus and a second apparatus,
   the first apparatus comprising:
   a storage communication module configured to carry out wireless communication with the second apparatus,
   a sensing module configured to detect a motion of the first apparatus, and
   a first control module configured to control the storage communication module to transmit content to the second apparatus and to transmit correction information corresponding to the motion of the first apparatus detected by the sensing module during transmission of the content to the second apparatus; and the second apparatus comprising:

a display communication module configured to carry out wireless communication with the first apparatus, a display module configured to display the content and the correction information received by the display communication module, a radio field strength detection module configured to detect a radio field strength received by the display communication module, and a display control module configured to control a contrast of the display module based on the radio field strength detected by the radio field strength detection module.

3. The system of claim 2, wherein the display control module is configured to set the display module to a first brightness value based a first radio field strength value detected by the radio field strength detection module, and to set the display module to a second brightness value darker than the first brightness value based on a second radio field strength value smaller than the first radio field strength value detected by the radio field strength detection module.

* * * * *